United States Patent Office 3,271,269
Patented Sept. 6, 1966

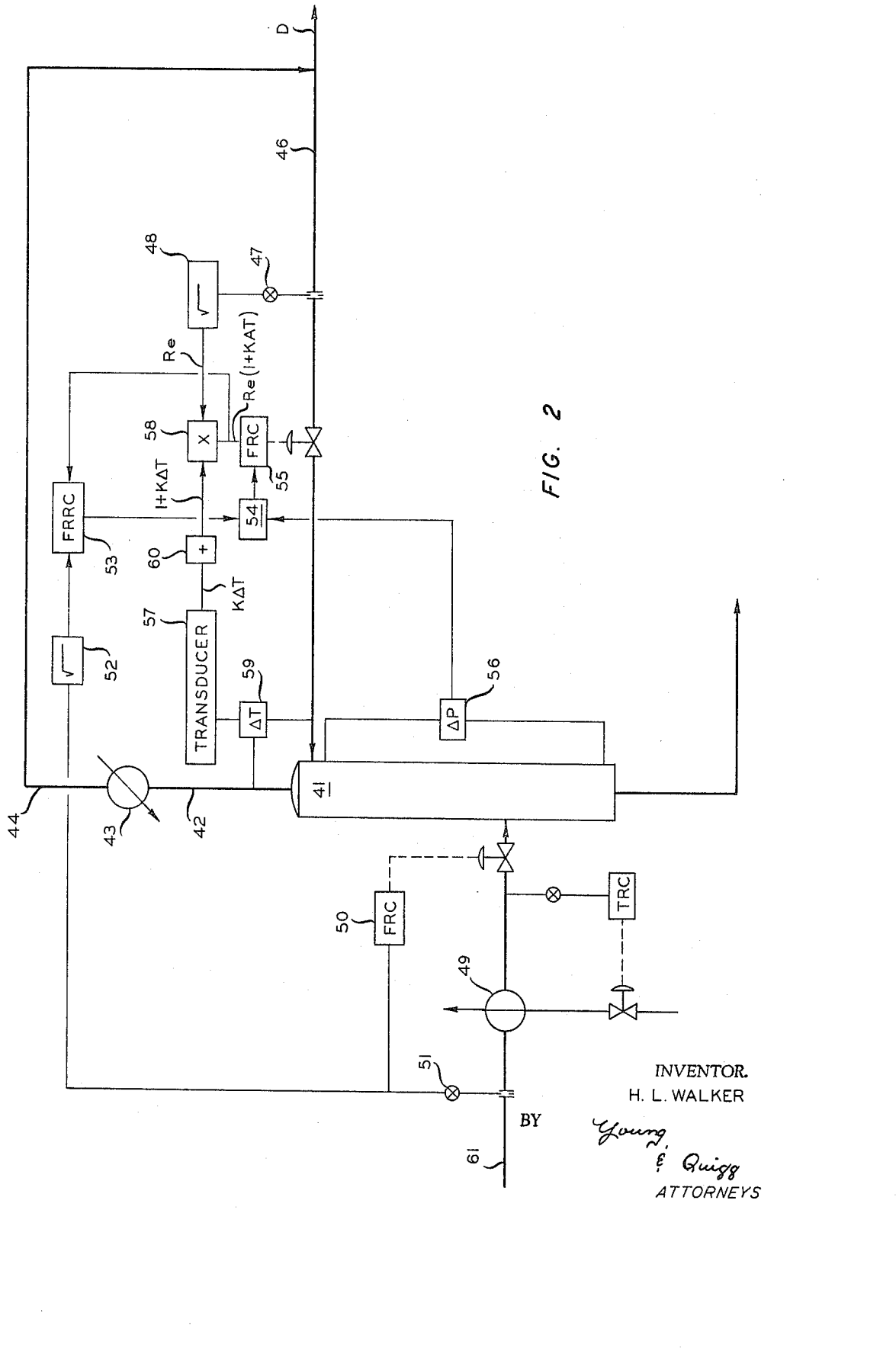

3,271,269
CONTROL SYSTEM FOR FRACTIONAL
DISTILLATION
Harry L. Walker, Bartlesville, Okla., assignor to Phillips Petroleum Company, a corporation of Delaware
Filed Dec. 26, 1961, Ser. No. 161,935
1 Claim. (Cl. 202—160)

This invention relates to the control of the operation of a fractional distillation column. In one aspect, this invention relates to a method of control of reflux to a fractionating column by utilizing a reflux to feed ratio controller. In another aspect, it relates to the control of fractionating column by utilizing a differential pressure controller to control the reflux addition to the column. A still further aspect relates to providing warning of approach to flooding by utilizing the differential pressure across the column. In another aspect, it relates to the warning of the approach to flooding and reducing the rate of reflux where said flooding is approached.

Heretofore, considerable difficulty with flooding in the general operation of fractionating columns has been experienced. While the initial rates of feed to reflux ratio are maintained at a constant value, often the rate of flow of these two streams will exceed the capacity of the column. In some cases, the column may be filled with liquid to the extent that the desired contact between the liquid reflux and vapors in the column is not attained and liquid and vapor are passed out of the top of the column. This condition is referred to in the art as flooding. To avoid this flooding, it is necessary to provide a system which will compensate for changes in the column at a point just prior to flooding so as to allow increased feed rate by decreasing the ratio of reflux to feed.

I have now found that such a result may be obtained in accordance with this invention by providing a system which compares the internal reflux required to make the desired separation with the maximum allowable internal reflux without flooding and producing a signal representative of the results of this comparison and utilizing same to control the external reflux flow rate.

Thus, an object of this invention is to provide a method for automatically controlling the addition of reflux to a fractional distillation column. Another object is to provide a method for controlling the rate of introduction of external reflux to a fractionating column in such a manner that when the feed is increased to above a predetermined value, the danger of flooding the column is avoided. A still further object is to provide a system which decreases external reflux when the fractionating column approaches flooding so that maximum load is maintained on the column. A still further object is to provide a method to reduce the reflux to feed ratio by reducing the external reflux fed to a fractionation column when the flow of feed becomes great enough to cause the column to flood.

In accordance with this invention there is provided a method and apparatus for reducing reflux introduction into a fractionating column at a point just prior to flooding so as to allow operation of the column to continue at a maximum load.

As another embodiment of this invention, the approach to flooding may be detected by utilizing the pressure drop across the column. This is accomplished by using a differential pressure controller set to operate on a differential pressure just below that pressure encountered in flood condition of the column. When the pressure drop from the bottom to the top of the column is above a predetermined maximum value, there is provided a signal to reset a flow recorder controller so as to decrease the ratio of reflux to feed rates.

FIGURE 2 represents a further embodiment of this invention wherein the pressure drop across the column is utilized to denote the approach to flooding.

Figure 1:
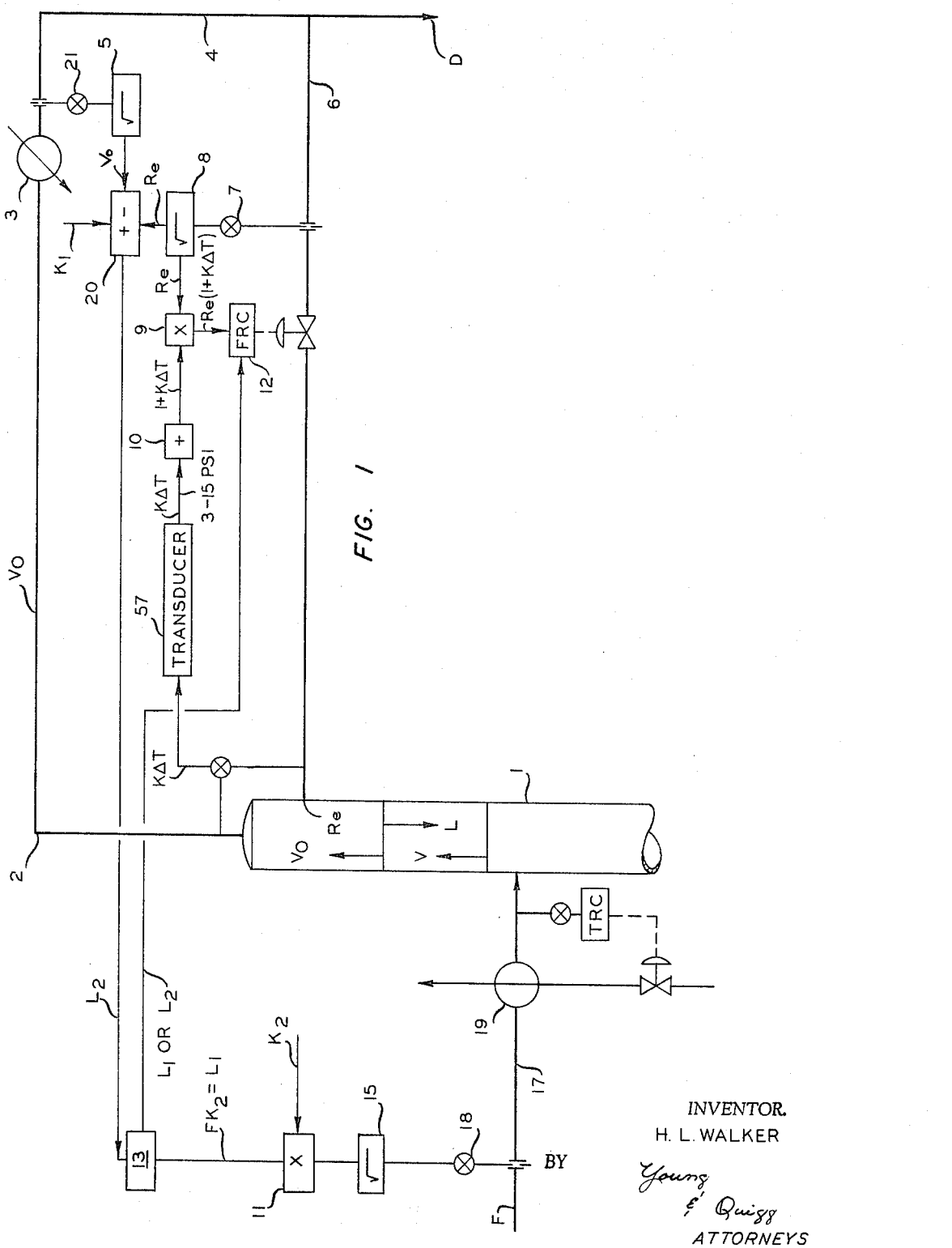
FIGURE 1 represents the reflux control according to the invention.

The control of internal reflux as obtained by using $K\Delta T$, transducer 57, adder 10, multiplier 9, square root extractor 8, flow transmitter 7 and FRC–12 is explained in I.S.A. Journal, June 1959, by D. E. Lupfer and D. E. Berger. The present invention provides a method of resetting FRC–12 to maintain a constant ratio of the rates of flow of feed to the internal reflux except when there is a danger of flooding the column. When the flooding stage is approached the rate of flow of internal reflux is reduced just below that which would cause the column to flood.

The following nomenclature will serve to aid in understanding this invention:

$D$=Overhead product
$F$=Feed
$K$=Ratio of sensible heat to heat of vaporization for overhead product
$K_1$=Maximum allowable internal vapor load without flooding
$K_2$=Reflux to feed ratio ($L_1/F$) required to make desired separation
$L$=Internal reflux
$L_1$=Internal reflux to make desired separation
$L_2$=Maximum allowable internal reflux without flooding
$R_e$=External reflux
$V_o$=Overhead vapors
$V$=Internal vapor load
    Calculation of $L_1$:
        $K_2=L_1/F$
        $L_1=FK_2$
    Calculation of $L_2$:
        $K_1=L_2+D$
        $D=Vo-Re$
        $K_1=L_2+Vo-Re$
        $L_2=K_1+Re-Vo$
        $K_1=V$ at maximum vapor load, where $V$ refers to the rectifying section $L_1$ signal will be the signal that is sent from low pressure selector transmitter to reset FRC–12 as long as $L_1$ is smaller than $L_2$, which is transmitted from computer 20. When $L_2$ is smaller than $L_1$ signal, $L_2$ signal will do the resetting of FRC–12. The smaller of the signals $L_1$ and $L_2$ is determined by low pressure selector transmitter 13.

$L_1$ signal is produced by extracting the square root of the signal transmitted from flow transmitter 18 and multiplying the square root by a constant $K_2$. $L_2$ signal is obtained by extracting the square root of the signal from transmitter 7, which is equal to $R_e$; extracting the square root of the signal from transmitter 21, which is equal to $V_o$; and passing resulting signals to computer 20, wherein $K_1$ is added to $R_e$ and $V_o$ is subtracted. The result of this computation is transmitted as $L_2$ to low pressure selector transmitter 13. As described in the previous paragraph, the smaller of the signals $L_1$ and $L_2$ is transmitted from low pressure selector transmitter 13 to reset FRC–12.

In operation as illustrated by FIGURE 1, transmitter 21 provides a signal relative to rate of flow of the condensed overhead vapor in lines 2 and 4. This in turn is introduced to square root extractor 5 which produces signal $V_o$ which is fed to computer 20. $K_1$ is added to $R_e$ and $V_o$ subtracted therefrom to give the value $L_2$ which is fed to low pressure selector transmitter 13. Simultaneously, transmitter 18 produces a signal relative to the rate of flow of the feed which is fed to square root extractor 15. This value is then fed to multiplier 11 which multiplies by $K_2$ to give the value $L_1$. This signal in turn is then fed to low pressure selector transmitter 13 which compares same with $L_2$ and utilizes the smaller of the two values to reset flow recorder controller 12.

As shown in FIGURE 2, column 41 is provided with conduit 42 through which overhead vapors are passed to condenser 43. Conduit 44 serves to remove fluid from the condenser. The removed overhead vapors may be taken off through conduit D as overhead product or passed through conduit 46 back to column 41 as external reflux. Conduit 46 is provided with transmitter 47 and square root extractor 48 which provides a signal representative of the external reflux. Feed stream 61 is provided with heat exchanger 49, if desired, and flow rate controller 50. In addition, transmitter 51 and square root extractor 52 serve to provide a signal representative of the rate of flow of feed to column 41. Transmitter 47 provides a signal which is relative to the flow through conduit 46. The signal provided by transmitter 47 is transmitted to square root extractor 48 and then to multiplier 58. This provides a signal to flow recorder controller 55 which then serves to regulate the flow through reflux conduit 46. Flow ratio recorder controller 53 serves to make a comparison of reflux to feed and maintains the relationship between same at any desired constant. This system controls the column conditions until the flooding point is approached. As this point is approached, there is a continual increase in pressure drop across the column which is measured by differential pressure controller 56 which in turn sends a signal, which is inverse to the pressure drop through 41, to low pressure selector relay 54. This instrument compares the signal obtained from differential pressure controller 56 with that received from flow ratio recorder controller 53. If the signal from differential pressure controller 56 becomes smaller than a predetermined value then low pressure selector relay 54 produces a signal to flow recorder controller 55 which serves to limit the amount of external reflux being added to the column and avoids flooding of the column while keeping the column operating at maximum capacity.

To further illustrate this invention, assume that a column is operating to provide separation in a pentane splitter and $K_2=3.56$.

PENTANE SPLITTER

|  | Feed | (OHP) Top | (KP) Bottom | Reflux |
|---|---|---|---|---|
| Temperature, °F | 204 | 185 | 225 | 151 |
| Pressure, p.s.i.g | 75 | 61 | 85 | 43 |
| Volume, MGPD | | 265 | 278 | 1931 |
| Composition, LV percent: | | | | |
| iC₄ | .16 | .32 | | .32 |
| nC₄ | .08 | .16 | | .16 |
| iC₅ | 53.52 | 95.10 | 13.95 | 95.10 |
| nC₅ | 41.96 | 4.42 | 77.69 | 4.42 |
| CyC₅* | 3.79 | | 7.40 | |
| C₆+ | .49 | | .96 | |
|  | 100.0 | 100.0 | 100.0 | 100.0 |

*Cyclopentane.
When the feed rate is 543 MGPD, $L_1=L_2$.
When the feed rate is smaller than 543 MGPD, $L_1$ will be less than $L_2$ and flow recorder controller 12 will be reset to increase the rate of flow of reflux.
When the feed rate is greater than 543 MGPD, $L_2$ will be less than $L_1$ and flow recorder controller 12 will be reset to decrease the flow of reflux.

In carrying out my invention, the instruments used are so adapted as to make the necessary calculations. In actual operation, my invention is used in conjunction with an internal reflux computer controller and a reflux to feed ratio controller. The reflux to feed ratio controller increases the reflux as the feed is increased in order to maintain the set reflux ratio which is necessary to make a desired separation. If the feed continues to increase, a point is reached where additional reflux will flood the column. At this point, my invention takes over and as the feed continues to increase the reflux is reduced to maintain the column load constant at this maximum load point—just below flood.

In actual operation a variety of systems may be utilized to control the internal reflux rate of the column. A suitable system is such as that disclosed by Lupfer et al., I.S.A. Journal, June 1959. Such a system while controlling the internal reflux rate serves to provide the value $R_e$ into the control system of this invention which is fed not only to the flow recorder controller but also to the adding means 20. (See FIGURE 1).

Reasonable variations and modifications are possible within the scope of the foregoing disclosure, drawings and the appended claim to the invention, the essence of which is that there has been provided a process for controlling the operation of a fractional distillation column so as to prevent flooding thereof which comprises sensing the approach to flooding condition in the column and then automatically regulating the flow of reflux to same at a reduced rate.

I claim:

Apparatus for controlling flooding in a fractional distillation column which comprises, in combination, a distillation column, means for introducing feed to said column, means to remove liquid from a first zone in said column, means to remove vapor from a second zone in said column, means to condense said vapor, means to introduce condensed vapor back into said second zone in said column as reflux, first transmitting means to measure the rate of flow of said condensed vapor from said column and to establish a first signal representative thereof, square root extracting means communicating with said first transmitting means and a computing means to establish a second signal representative of the rate of flow of condensed vapor from said column and to introduce said second signal to said computing means which provides a first value representative of the maximum allowable internal reflux without flooding, second transmitting means in operable association with said means to introduce reflux to measure the rate of reflux to said column and to establish a third signal representative thereof, square root extracting means in operable association with said second transmitting means and said computing means to receive said third signal and to introduce said third signal to said computing means, third transmitting means to measure the rate of flow of feed to said column and to establish a fourth signal representative thereof, square root extracting means in operable association with said third transmitting means and a multiplying means to receive said fourth signal and to introduce same to said multiplying means, said multiplying means adapted to multiply said fourth signal by the predetermined reflux-to-feed ratio required to obtain the desired distillation and to produce a second value representative of the internal reflux required to make the desired separation, fourth transmitting means to measure said first and second values and to establish a fifth signal representative of the smaller of said first and second values, and flow recorder controller means in operable association with said fourth transmitting means and responsive to said fifth signal to regulate flow control means operably associated with said means to introduce condensed vapors back into said second zone.

(References on following page)

References Cited by the Examiner

UNITED STATES PATENTS

| | | | |
|---|---|---|---|
| 2,816,858 | 12/1957 | Walker | 202—160 |
| 2,985,565 | 5/1961 | Bellringer | 196—132 |
| 3,020,213 | 2/1962 | Lupfer | 196—132 |

OTHER REFERENCES

Instruments, vol 8, Issue 6, Lafkowitz, published, June 1952, (pp. 772–777; p. 774 spec. relied on).

I.S.A. Journal, vol. 6, No. 6, Lupfer et al., June 1959 (pp. 34–39).

Chemical Engineering Progress, vol 55, No. 7, June, 1959, R. Parkins (pp. 60–68), (pp. 63 and 64 relied upon).

NORMAN YUDKOFF, *Primary Examiner.*

GEORGE D. MITCHELL, *Examiner.*

W. L. BASCOMB, *Assistant Examiner.*